United States Patent [19]
Martin et al.

[11] Patent Number: 5,730,781
[45] Date of Patent: Mar. 24, 1998

[54] REGENERATION PROCESS AND PLANT FOR ABSORBENTS USED FOR PROCESSING COMBUSTION PRODUCTS IN THERMAL BOILERS

[75] Inventors: Gérard Martin, Rueil-Malmaison; Luc Nougier, Le Vesinet; Jean-Christophe Dolignier, Paris, all of France

[73] Assignee: Institut Francais du Petrole, Rueil Malmaison, France

[21] Appl. No.: 600,727

[22] Filed: Feb. 13, 1996

[30] Foreign Application Priority Data

Feb. 14, 1995 [FR] France .................. 95 01753

[51] Int. Cl.$^6$ .................................. B01D 53/12
[52] U.S. Cl. .................. 95/108; 95/114; 95/137; 95/148; 95/275; 95/279; 96/123; 96/130; 96/144
[58] Field of Search .................. 95/108–111, 114, 95/115, 137, 148, 275, 279; 96/108, 123, 130, 136, 141, 144, 150

[56] References Cited

U.S. PATENT DOCUMENTS

| | | |
|---|---|---|
| 1,547,924 | 7/1925 | Kerschbaum .................. 95/100 |
| 2,834,429 | 5/1958 | Kinsella, Jr. et al. .................. 95/108 |
| 3,563,704 | 2/1971 | Torrence .................. 95/108 |
| 4,046,530 | 9/1977 | Izumo et al. .................. 96/123 |
| 4,396,590 | 8/1983 | Cheng .................. 95/275 X |
| 4,764,355 | 8/1988 | Romey et al. .................. 95/137 X |
| 4,973,458 | 11/1990 | Newby et al. .................. 95/108 X |
| 5,106,395 | 4/1992 | Weber et al. .................. 95/279 |
| 5,302,188 | 4/1994 | Neal et al. .................. 95/109 X |
| 5,325,797 | 7/1994 | Mei et al. .................. 110/245 |

FOREIGN PATENT DOCUMENTS

| | | |
|---|---|---|
| 0 254 402 | 1/1988 | European Pat. Off. . |
| 0 356 658 | 3/1990 | European Pat. Off. . |
| 0 495 710 | 7/1992 | European Pat. Off. . |
| 39 10 716 | 10/1990 | Germany . |
| WO87/01050 | 2/1987 | WIPO . |

*Primary Examiner*—Robert Spitzer
*Attorney, Agent, or Firm*—Antonelli, Terry, Stout & Kraus, LLP

[57] ABSTRACT

According to the invention, regeneration is performed by filtering and by regenerating simultaneously the used absorbent; two stages are carried out for the regeneration: one, which is a rough stage, is performed in the presence of a regeneration gas; the other, a free stage, is performed in the presence of a fresh regeneration gas.

18 Claims, 5 Drawing Sheets

REGENERATION PROCESS AND PLANT FOR ABSORBENTS USED FOR PROCESSING COMBUSTION PRODUCTS IN THERMAL BOILERS

BACKGROUND OF THE INVENTION

The present invention relates to the field of thermal combustion and more particularly to the regeneration of absorbents used for processing products resulting from the combustion.

The French patent FR-2,636,720 in the name of the claimant discloses a boiler according to which desulfurizing agents are injected into a specific zone, referred to as desulfurization chamber, interposed between the combustion chamber and a heat recovery chamber. The desulfurizing agents provided in this plant are preferably non regeneratable calcic absorbents.

Various improvements have been brought about to this type of boilers in order to increase the thermal efficiency while having the highest efficiency possible for the trapping of sulfur oxides notably.

An improvement illustrated in the French patent application FR-2,671,855 consists in using so-called "regeneratable" absorbents that are used in situ, i.e. in a space specially provided in the boiler, downstream from the combustion chamber. This improvement, which retains the advantages of the plants using non regeneratable absorbents, notably regarding desulfurization, also allows to limit very noticeably the amounts of used absorbent to be dumped, which is very favourable to the quality of the environment. Furthermore, the very high decrease in the amounts of used absorbent to be eliminated allows inerting treatments to be envisaged at non prohibitive costs.

In the plant described above, it is suggested that the regeneration of the absorbent can be performed by means of a fluidized bed or possibly with the aid of a rotary furnace.

There still remains an important problem as to the carry-over of the free particles, and notably technologic difficulties arise in obtaining a perfect seal, at high temperatures and in the presence of corrosive gases, between the cylinder and the outside.

These implementations pose a certain number of problems notably linked to the small grain size of the absorbent used. In fact, in fluidized bed systems, the fluidization of free particles leads to the creation of preferential paths for the gas, which is translated into a poor contact between the gas and the absorbent particles.

Of course, the quality of the contact between the absorbent and the gas to be processed is a key element for the regeneration efficiency of the absorbent.

A solution to this problem could consist in mixing the absorbent (of free grain size) with particles of an inert material with a larger grain size.

When used absorbent particles of 5 to 20 microns are mixed with particles of 100 microns of an inert material, a very marked improvement in the fluidization quality is thus observed, but it is very difficult thereafter to separate the two particle populations prior to reinjecting the regenerated absorbent into the heat generation plant. When the inert material added to the absorbent exhibits a grain size above 300 microns for example, the separation of the two particle populations is easier, but the fluidization quality degrades again, notably because of segregation phenomena that develop in the fluidized bed: the coarse particles sediment at the bottom of the bed while the free particles "float on the surface" in the upper part of the bed, thus re-creating the same type of bed as with the used absorbent alone.

Another problem encountered with such plant types is linked to the fly-off of the free absorbent particles. In order to limit the fly-off of free particles, it is therefore necessary to have very low gas velocities, which leads to very large equipment sizes.

Document FR-2,702,392 describes another regeneration means using a vibrating elevator in which the absorbent and the reducing gas preferably follow a countercurrent circulation. However, the piston type flow achieved in the vibrating elevator proves difficult in practice, notably when powdery products are to be conveyed.

Besides, there are locally overheated zones in the known devices, when the temperatures are such that the activity of the absorbent is disturbed and its life span decreased. The present invention allows these drawbacks to be avoided.

The simplicity and the compactness of the plant constitute other advantages inherent in the invention. In fact, as explained hereafter, several functions that were previously fulfilled in several reactors are combined here in a single chamber.

Another advantage of the present invention lies in its working flexibility which finds expression notably in the residence time of the absorbent, the regeneration temperatures, the flow rates of the solids. These parameters can be advantageously modulated in a precise and reliable way.

In other words, a reliable and precise control of the plant and of the associated working process can be obtained according to the invention.

SUMMARY OF THE INVENTION

The object of the present invention is thus a regeneration process for a used absorbent used for processing non-burning gases, according to which the major part of said regeneration is performed by filtering and by regenerating simultaneously the used absorbent on a filtering element, in a reducing atmosphere.

According to the invention, the regeneration gas used is a hydrocarbon-containing gaseous compound having a total carbon number less than 10, such as hydrogen, methane, ethane, propane or isobutane and/or a mixture of said gases.

A stage of preheating of all or part of the absorbent to be regenerated is advantageously performed prior to the regeneration.

Besides, a periodic declogging can be performed simultaneously with the regeneration-filtration.

Said regeneration is preferably performed in at least two stages:
 a first stage consisting in a regeneration achieved in the presence of a first regeneration gas, and
 a second stage consisting in a free regeneration performed in the presence of a fresh regeneration gas.

The regeneration gas used in the first stage is preferably a gas that has already partly been used.

The invention notably covers the regeneration of sulfur oxides absorbents used for processing combustion fumes or process gases.

The object of the invention is also a regeneration plant for a used absorbent used for processing non-burning gases and which includes a filtering element placed in direct contact with a regeneration means working in a reducing atmosphere, the filtering element being such that it allows to increase the contact time between the used absorbent and the regeneration means.

The regeneration means can comprise a fluidized bed.

In accordance with the invention, the plant then includes means for injecting a fresh regeneration gas, situated at the level of said fluidized bed.

Furthermore, the plant according to the invention can include a heat generation means placed upstream from the regeneration means, through which the absorbent to be regenerated, that is conveyed preferably pneumatically with all or part of the regeneration gas, is preheated prior to entering the regeneration means.

Besides, it also comprises at least one heat exchanger intended to recover at least part of the sensible heat of the regenerated absorbent.

It further comprises advantageously at least one heat exchanger intended to recover at least part of the sensible heat of the regeneration gases.

Without departing from the scope of the invention, the plant also comprises a means intended to increase the pressure of the regeneration gases coming from the regeneration means.

BRIEF DESCRIPTION OF THE DRAWINGS

Other features, details and advantages of the present invention will be clear from reading the description hereafter, given by way of non limitative example, with reference to the accompanying drawings in which.

DESCRIPTION OF THE PREFERRED EMBODIMENTS

Figure 1:
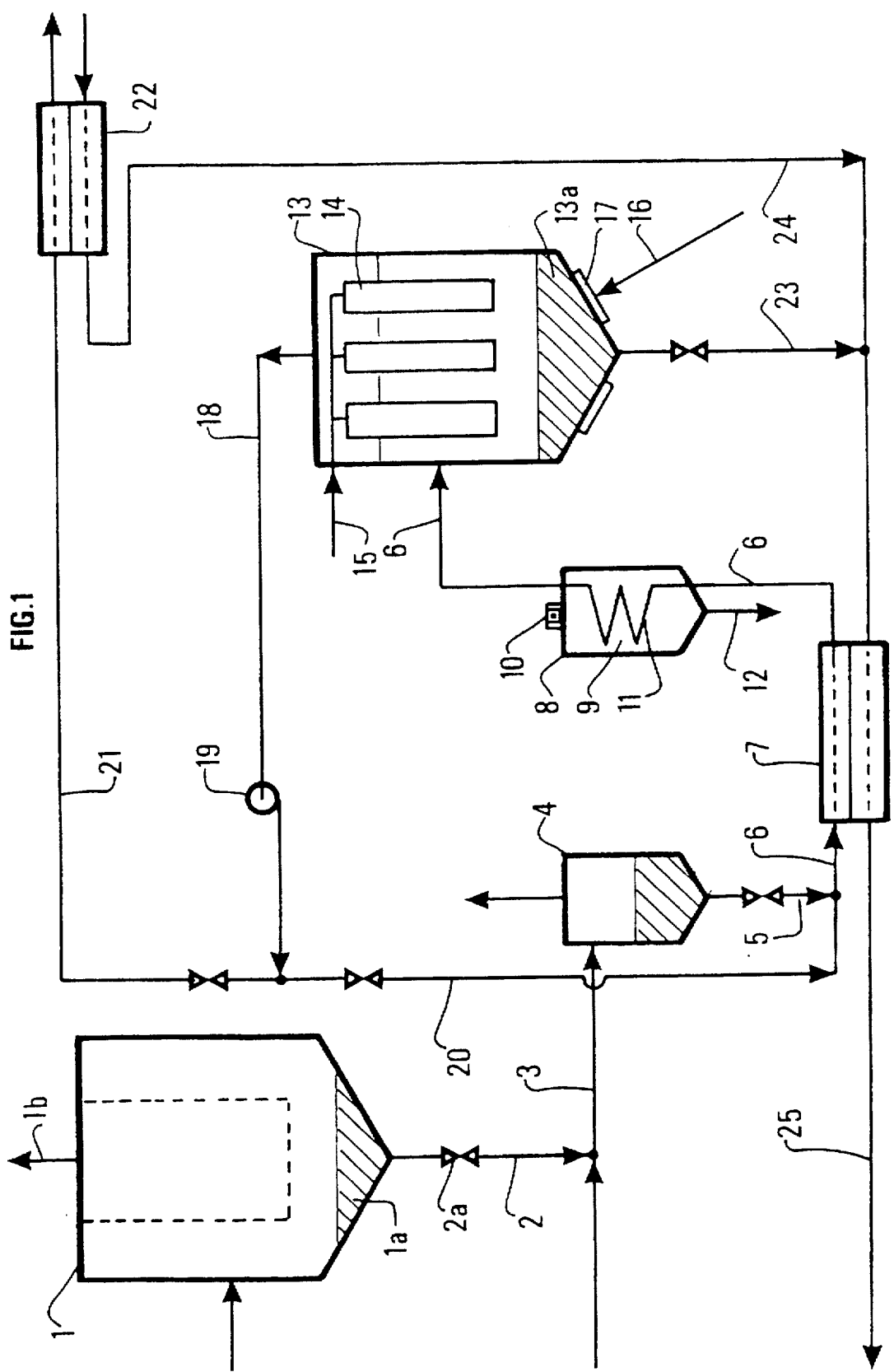
FIG. 1 is a schematic representation of an embodiment of the invention.

FIG. 1 illustrates an example of a plant according to the invention.

Reference number 1 shows a dust separator through which are filtered the fumes coming out of a boiler (not shown) that specifically burns sulfur-containing liquid or gaseous fuels.

The outlet of a boiler such as that described in patent application FR-2,671,855 can thus constitute the inlet of the filtering element 1. The outlet of any other means generating polluted effluents and equipped with the same fumes desulfurization means can of course constitute the inlet of element 1.

Dust separator 1, which is however not essential for the smooth running of the invention, allows to perform a first separation between the fumes coming out through a chimney 1b, and the used absorbent that has collected the sulfur oxides.

The latter is discharged by gravity through an outlet 1a in a line 2. A valve 2a or any other equivalent means situated on line 2 can allow the used absorbent to be temporarily stored in proximity to outlet 1a.

Downstream, a carrier fluid (fumes) can be mixed with the used absorbent so as to ensure its pneumatic transportation, via a line 3, to a storage hopper 4.

The carrier gas can be air or better still a gas with a low oxygen content or without oxygen, such as fumes, so as to avoid the presence of oxygen in hopper 4 and to prevent thereby possible risks of explosion if regeneration gases should inadvertently enter said hopper 4.

The used absorbent is thereafter recovered below said hopper 4 by means of a line 5 that includes for example a rotary canal lock and an ejector (not referenced) and it is driven by pneumatic transportation means to a filter-reactor 13 through a line 6. The gas used for conveying the used absorbent is preferably regeneration gas taken at the outlet of filter-reactor 13.

Prior to entering filter-reactor 13, the mixture (used absorbent and carrier gas) first passes into a gas-to-gas exchanger 7 in which circulate in a countercurrent flow said mixture and a mixture of regenerated absorbent and of carrier gas coming from filter-reactor 13. In this gas-to-gas exchanger 7, the mixture (used absorbent and carrier gas) recovers part of the sensible heat of the regenerated absorbent and of the gas that carries it.

The gas-to-gas exchanger 7 is designed to work with high solid loads, i.e. for solids-gas mass ratios up to ten. Still prior to reaching filter-reactor 13, the mixture (used absorbent and carrier gas) passes, according to this embodiment of the invention, in a thermal generator 8 where it is brought, to a temperature close to the working temperature of filter-reactor 13.

Thermal generator 8 can include a combustion chamber 9, a heating equipment 10 working with a liquid or a gaseous fuel and a helical tube 11 leaning against the walls of combustion chamber 9, in which circulates the mixture of used absorbent and of carrier gas.

The combustion effluents from thermal generator 8 are discharged through a chimney 12 or directed towards a heat recuperator which can be the boiler itself.

The mixture (used absorbent and carrier gas) then enters filter-reactor 13. This filter-reactor 13 can include several rows of vertical filtering elements 14. The main part of the used absorbent, carried over by the carrier gas, adheres to the filtering elements 14 where it forms a cake. This cake is regularly declogged by means of a device 15 which momentarily creates a back pressure downstream from filtering elements 14, thanks to the sudden injection of a certain quantity of regeneration gas or of a neutral gas such as nitrogen.

Declogging causes the cake to fall into the lower part 13a of the filter-reactor, where an accumulation forms.

Fresh regeneration gas delivered through a line 16 is fed into the lower part (13a) of reactor 13 by means of diffusers 17. A pseudo fluidized bed thus forms in this lower part 13a, and part of the absorbent can again be carried over towards the filtering elements 14 situated above the fluidized bed.

In a characteristic way, the filtering elements are thus used here as means allowing to increase the solid-gas contact time and therefore to improve said contact.

In a certain way, the regeneration of the absorbent is performed in two stages: a first roughing stage on filtering elements 14, in the presence of a regeneration gas that has already partly been used, and a finishing stage using a pseudo fluidized bed in the lower part 13a of the filter-reactor, in the presence of fresh regeneration gases which are therefore more active.

The regeneration gases that have already been partly used leave filter-reactor 13 through a line 18 after percolating successively through the lower part 13a of reactor 13, then through filtering elements 14.

They can be recompressed by a fan or a compressor 19. Part of the regeneration gases can then be recycled via a line 20 and thus serve for conveying the used absorbent drawn off from hopper 4. Another part of the regeneration gases is discharged, according to this embodiment of the invention, via another line 21 towards a process unit such as a Claus plant for example.

Part of the sensible heat of these regeneration gases to be discharged can be recovered at the level of a gas-to-gas exchanger 22. Said regeneration gases and a gas that is preferably oxygen-free or oxygen-poor in order to avoid the above-mentioned risks of explosion in filter-reactor 13 circulate in a countercurrent flow in this exchanger. This carrier gas will serve to convey the regenerated absorbent. At the level of exchanger 22, the carrier gas recovers part of the sensible heat of the regeneration gases to be discharged.

The regenerated absorbent discharged in the lower part 13a of the filter-reactor can be recovered through a line 23 that includes for example a rotary canal lock and an ejector (not referenced).

Line 23 can then run through the above-cited exchanger 7 in order to preheat the used absorbent before it reaches regenerator 13.

In line 23, the carrier gas intended for the used absorbent can come from exchanger 22 via a line 24.

After passing through the gas-to-gas exchanger 7, the mixture of regenerated absorbent and of carrier gas can for example be driven back, via a line 25, towards a desulfurization zone of a boiler or towards a temporary storage facility.

Figure 2:
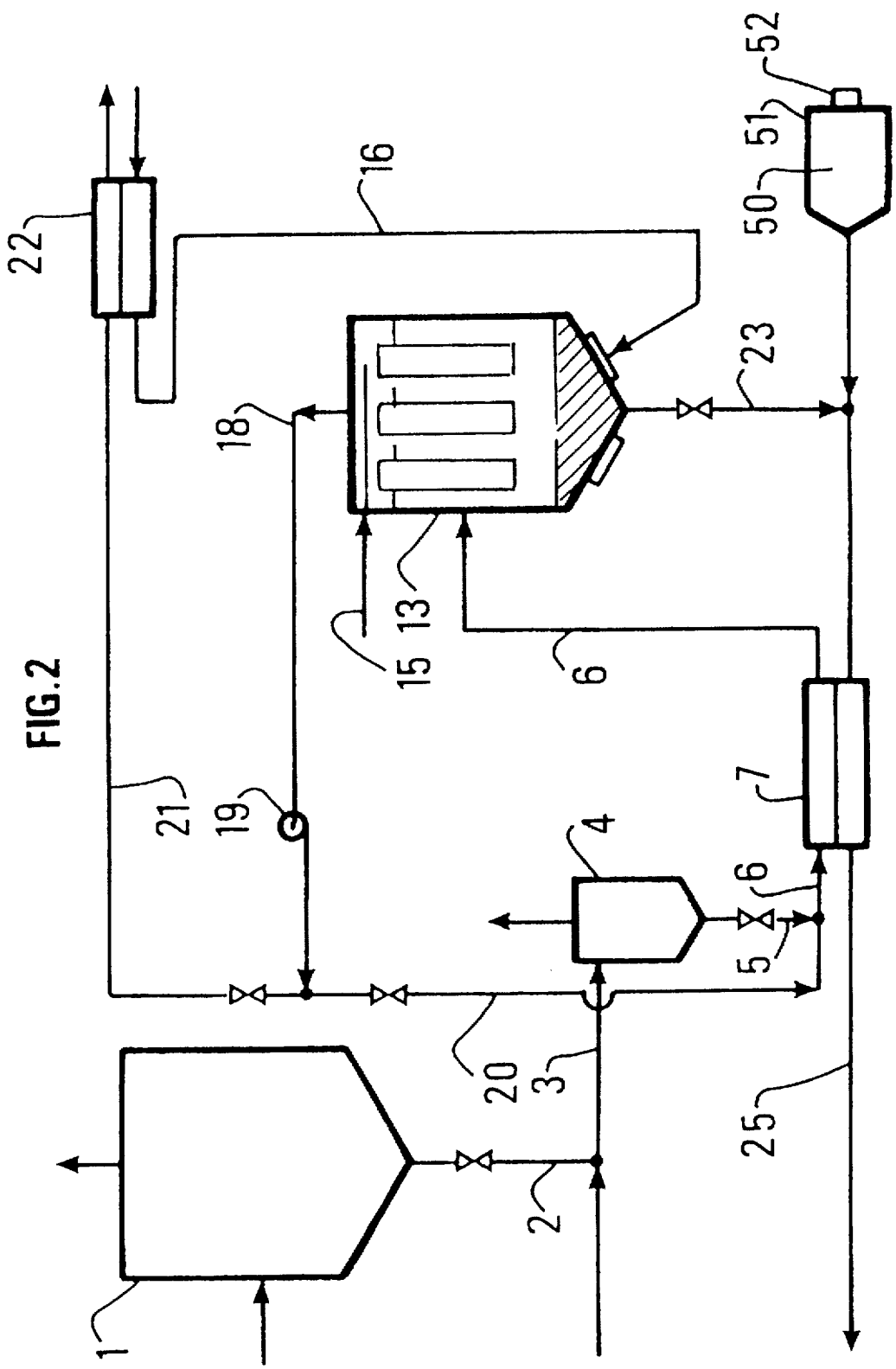
FIG. 2 is a schematic representation of another embodiment of the invention.

FIG. 2 illustrates a possible variant of FIG. 1, the differences residing mainly in the heating means and in the energy recovery. In fact, the main difference lies in the disappearance of the generator 8 placed on line 6.

According to this embodiment of the invention, the mixture of used absorbent and of carrier gas conveyed through line 6 is thus brought, only by means of exchanger 7, to a temperature close to that of filter-reactor 13. This result is reached by overheating somewhat the regenerated absorbent by means of hot fumes coming from an additional furnace 50.

The additional furnace 50 includes for example a heat-resisting chamber 51 equipped with a gas or an oil burner 52. Burner 52 generates fumes with a temperature ranging between 600° and 1500° C., preferably between 700° and 900° C. The hot fumes produced by furnace 50 are mixed with the regenerated absorbent in line 23 so that they serve to convey pneumatically the regenerated absorbent towards the gas-to-gas exchanger 7, then towards the boiler or an intermediate storage facility that are not shown in FIG. 2.

Besides, according to this embodiment of the invention, the fresh regeneration gas is preheated at the level of the gas-to-gas exchanger 22 prior to being fed into the lower part 13a of the filter-reactor through line 16.

Figure 3:
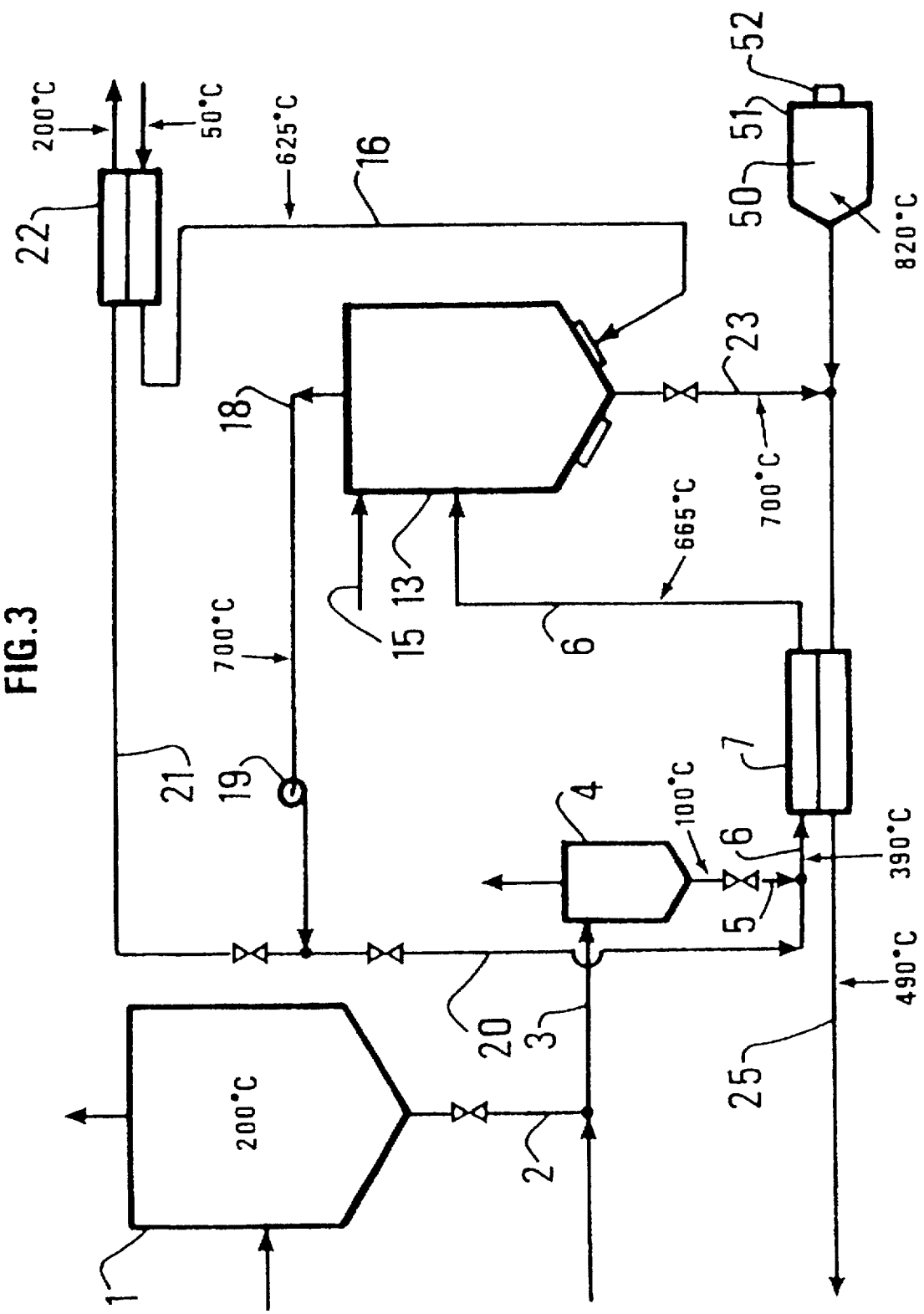
FIG. 3 is a diagram showing the working temperatures of the various components of the plant according to FIG. 2.

FIG. 3 precisely shows the temperature levels in different places of the plant according to FIG. 2.

Figure 4:
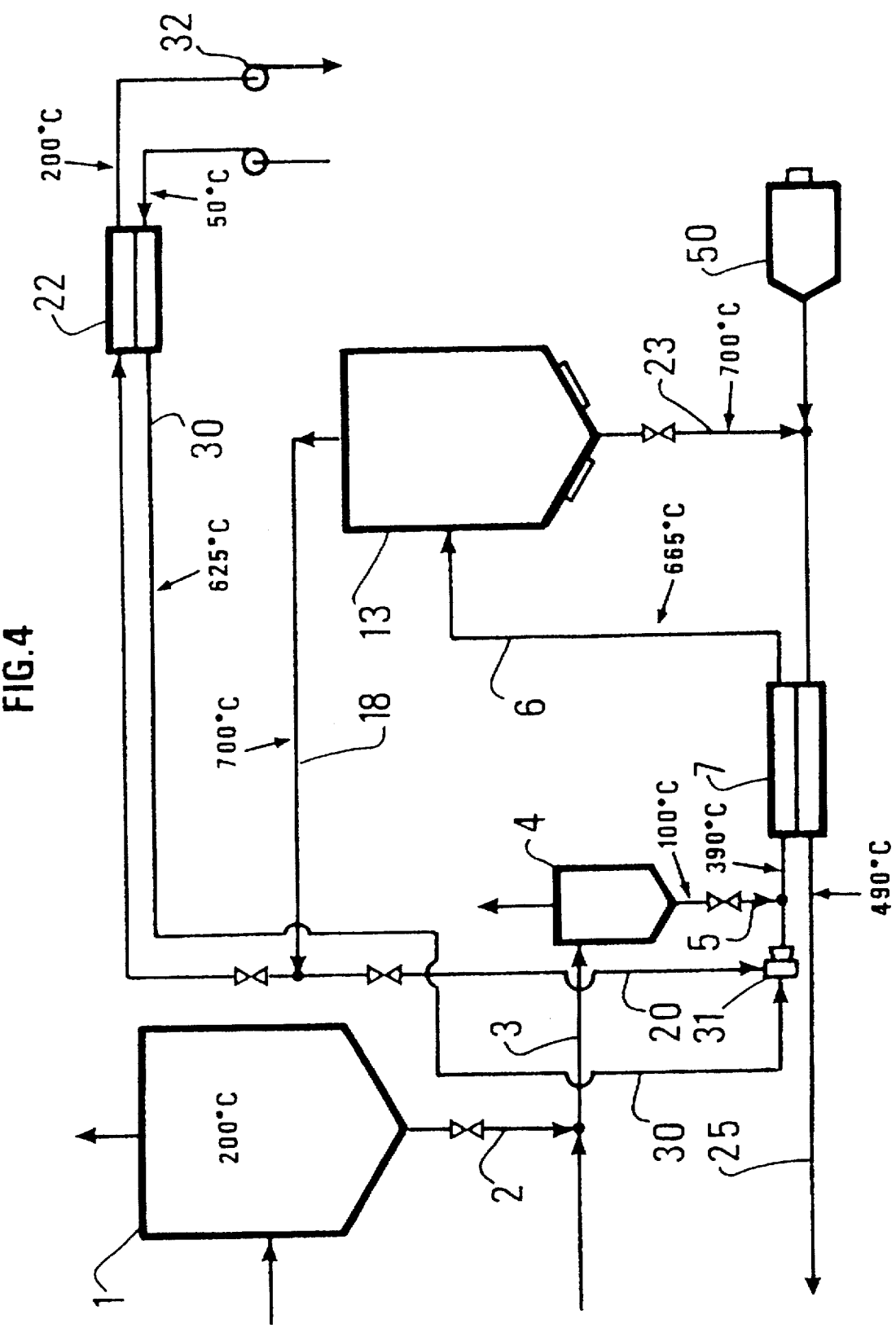
FIG. 4 is a schematic representation of a particular embodiment of the invention.

FIG. 4 shows an embodiment of the invention which differs from that of FIG. 2 mainly in the point of introduction of the fresh regeneration gas.

In fact, according to this embodiment of the invention, the fresh regeneration gas, after flowing through exchanger 22, can be driven via a line 30 towards exchanger 7, more precisely upstream from this exchanger, in order to be mixed with the used absorbent stored in storage means 4.

Furthermore, pump 19 has been removed because it can be damaged if the gases conveyed through line 18 are brought to too high temperatures. Pump 19 can be replaced by a means 31 allowing to compensate for the pressure drop in the regenerator-filter 13 and to ensure the circulation of the recycled regeneration gas.

A high-pressure fresh regeneration gas can thus be used as a working fluid for the recycled regeneration gas and mixed at the level of means 31.

Just downstream from means 31, the used absorbent to be regenerated is mixed with the mixture of fresh and of recycled regeneration gases. The mixture is thereafter heated in exchanger 7 prior to reaching the filter-regenerator 13.

The temperature levels at different points of this plant are given in FIG. 4.

Figure 5:
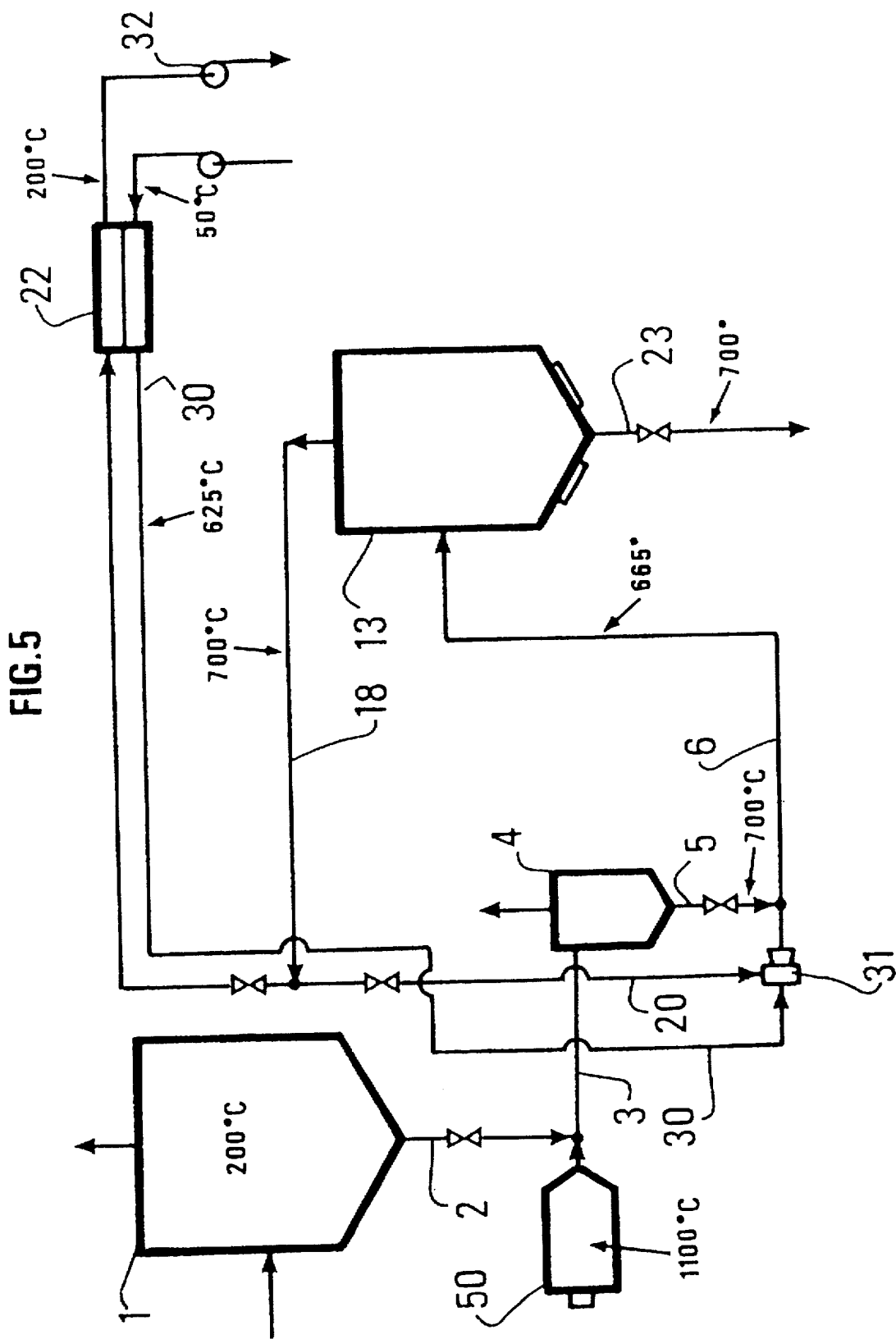
FIG. 5 is a schematic representation of another specific embodiment of the invention.

FIG. 5 illustrates an evolution of the plant according to FIG. 4. Exchanger 7 has been removed, which prevents clogging problems inherent in this type of material when gases containing high particle loads run therethrough.

According to this embodiment of the invention, the regenerated absorbent that flows out of filter-regenerator 13 is thus led directly outside the plant, without any heat exchange. Its pneumatic transportation can be performed with cold fumes or with air.

The absorbent to be regenerated is recovered, as in FIG. 4, at the outlet of storage hopper 4, where it is mixed with the fresh regeneration gas and the recycled regeneration gas as stated above.

The used absorbent is preheated as soon as it leaves dust separator 1, by contacting said used absorbent with hot fumes or hot carrier gases coming from the thermal generator 50 situated at the outlet of dust separator 1.

The following temperatures have been recorded by way of example: 200° C. in dust separator 1; 1100° C. in furnace 50; 700° C. at the outlet of storage hopper 4; 700° C. at the outlet of filter-regenerator 13; 625° C. in the fresh gas supply line.

The device described above is particularly well-suited for the regeneration of sulfur oxides absorbents used for processing combustion fumes or process gases.

The magnesium component of these absorbents is preferably such as described in French patent application 92/08, 076 in the name of IFP, but other formulations are not excluded.

The average grain size of these regeneratable absorbents is less than 500 microns and preferably less than 50 microns.

The regeneration gas can be hydrogen, methane, ethane, propane, isobutane, and more generally any hydrocarbon-containing gaseous compound having a total carbon number less than 10, or any mixture of the above-cited gases, such as the combustible gases that are found in refineries and that contain hydrogen, methane, carbon monoxide and light hydrocarbons.

The regeneration temperature, i.e. the temperature at which the filter is operated, ranges between 500° and 1000° C., preferably between 600° and 800° C.

The regeneration reactor is preferably made up of vertical cylindrical filtering elements superposed on one another, such as those encountered in conventional dedusting devices. These cylindrical elements, which are several ten or even several hundred in number, typically have lengths ranging between 0.5 and 5 meters and diameters ranging between 2 and 20 cm. However, other fittings of the plate type for example are not excluded. The filtering elements can be metallic or made of ceramic materials or comparable materials. The porosity and the size of the channels of these filtering elements are adjusted in a conventional way, so as to ensure a gas-solid separation greater than 99% and preferably greater than 99.9%.

The filter-reactor also comprises means ensuring the declogging of the absorbent cake deposited on the filtering elements. These declogging means can be means creating an instantaneous back pressure, vibrating means or any other means conventionally used in the field of sleeve dust separators. The declogging frequency can range between 10 seconds and one hour and preferably between 5 and 20 minutes. The rate of flow of the regeneration gas on the absorbent cake ranges between 0.1 and 10 cm/s, preferably between 0.5 and 2 cm/s. The cake thicknesses range between 0.1 and 5 cm and preferably between 0.5 and 2 cm. The recycle ratio of the regeneration gases ranges between 0 and 10 and preferably between 1 and 3.

The description above shows that the regenerator-filter 13 according to the invention is simple and compact. It allows to fulfil several functions within a single chamber: regeneration, gas filtration and even storage of the regenerated absorbent.

Furthermore, the plant according to the invention exhibits a modular character: in fact, several filter-regenerators can be mounted in series or in parallel and each can work in an independent way. This increases the reliability of the plant, coffers a very high flexibility thereon, so that very variable used absorbent flow rates can be processed. This possibility considerably simplifies the operation while keeping a very high efficiency.

Moreover, the plant has a low thermal inertia, which allows any drift from one of the operating parameters to be quickly corrected.

The filter-reactor according to the invention is particularly well-suited for a regeneration reaction that requires contact temperatures between gases and solids of several minutes. The regeneration efficiency is therefore very high.

The whole plant has been so designed that safety problems are non-existent. The risk of explosion is in particular minor if appropriate devices are installed in order to properly isolate the oxidizing atmosphere of the boiler and the reducing atmosphere of the regenerator.

We claim:

1. A process for regenerating a used absorbent used for processing non-burning gases, wherein the major part of the regeneration is performed by filtering and by regenerating simultaneously the used absorbent on a filtering element in a reducing atmosphere using a regeneration gas comprising a hydrocarbon-containing gaseous compound having a total carbon number less than 10.

2. A process as claimed in claim 1, where the regeneration gas used is at least one of gas selected from the group consisting of hydrogen, methane, ethane, propane and isobutane.

3. A process as claimed in claim 1, wherein a stage of preheating of all or part of the absorbent to be regenerated is performed prior to the regeneration.

4. A process as claimed in claim 1, wherein a declogging operation is periodically performed simultaneously with the filtration-regeneration.

5. A process as claimed in claim 1, wherein the used absorbent has an average grain size less than 500 microns.

6. A process as claimed in claim 5, wherein the used absorbent has an average grain size less than 50 microns.

7. A process as claimed in claim 1, wherein said regeneration is performed in at least two stages:

a first stage consisting in a regeneration achieved in the presence of said regeneration gas, and a second stage consisting in a free regeneration achieved in the presence of a fresh volume of said regeneration gas.

8. A process as claimed in claim 7, wherein said regeneration gas used during the first stage is a gas that has already partly been used in said second stage.

9. Use of the process as claimed in claim 1 for the regeneration of sulfur oxides absorbents used for processing combustion fumes or process gases.

10. A plant for regenerating a used absorbent used for processing non-burning gases, comprising regeneration means for regenerating the used absorbent by contact with a reducing atmosphere using a regeneration gas comprising a hydrocarbon gaseous compound having a total carbon number less than 10, said regeneration means including a filtering element placed in direct contact with the used absorbent in the reducing atmosphere, the filtering element being such that it allows to increase the contact time between the used absorbent and the regeneration gas.

11. A plant as claimed in claim 10, wherein said regeneration means comprises a fluidized bed.

12. A plant as claimed in claim 11, comprising means for injecting a fresh regeneration gas situated at the level of said fluidized bed.

13. A plant as claimed in claim 10, further comprising a heat generation means situated upstream from said regeneration means, through which the absorbent to be regenerated is preheated prior to entering said regeneration means.

14. A plant as claimed in claim 10, further comprising at least one heat exchanger intended to recover at least part of the sensible heat of the regenerated absorbent.

15. A plant as claimed in claim 10, further comprising at least one heat exchanger intended to recover at least part of the sensible heat of the regeneration gases.

16. A plant as claimed in claim 10, further comprising a means intended to increase the pressure of the regeneration gases coming out of said regeneration means.

17. A plant as claimed in claim 10, wherein said filtering elements comprise cylindrical filtering elements superposed on one another.

18. A plant as claimed in claim 10, wherein said regeneration gas is at least one gas selected from the group consisting of hydrogen, methane, ethane, propane and isobutane.

* * * * *